United States Patent
Takahashi et al.

(10) Patent No.: US 9,479,930 B2
(45) Date of Patent: Oct. 25, 2016

(54) MOBILE COMMUNICATION METHOD, RELAY NODE, AND RADIO BASE STATION

(75) Inventors: Hideaki Takahashi, Tokyo (JP); Wuri Andarmawanti Hapsari, Tokyo (JP); Anil Umesh, Tokyo (JP); Mikio Iwamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 93 days.

(21) Appl. No.: 13/817,108

(22) PCT Filed: Aug. 12, 2011

(86) PCT No.: PCT/JP2011/068446
§ 371 (c)(1),
(2), (4) Date: Apr. 19, 2013

(87) PCT Pub. No.: WO2012/023513
PCT Pub. Date: Feb. 23, 2012

(65) Prior Publication Data
US 2013/0203381 A1    Aug. 8, 2013

(30) Foreign Application Priority Data

Aug. 16, 2010 (JP) ................................. 2010-181881

(51) Int. Cl.
*H04W 12/00* (2009.01)
*H04W 12/10* (2009.01)
*H04W 12/04* (2009.01)
*H04B 7/155* (2006.01)
*H04W 84/04* (2009.01)

(52) U.S. Cl.
CPC ............ *H04W 12/04* (2013.01); *H04B 7/155* (2013.01); *H04L 2463/061* (2013.01); *H04W 12/10* (2013.01); *H04W 84/047* (2013.01)

(58) Field of Classification Search
CPC .... H04W 12/00; H04W 12/04; H04W 12/10
USPC ........................................................ 455/410
See application file for complete search history.

(56) References Cited

U.S. PATENT DOCUMENTS

| | | | |
|---|---|---|---|
| 8,041,335 B2* | 10/2011 | Khetawat | H04L 63/104 455/404.1 |
| 8,412,157 B2* | 4/2013 | Wang | H04L 63/0414 380/270 |
| 8,630,648 B2* | 1/2014 | Rune et al. | 455/438 |
| 8,660,088 B2* | 2/2014 | Nordstrand | H04W 36/0038 370/331 |
| 8,826,011 B2* | 9/2014 | Hahn et al. | 713/160 |

(Continued)

OTHER PUBLICATIONS

3GPP TR 36.806 V9.0.0, "3rd Generation Partnership Project; Technical Specification Group Radio Access Network; Evolved Universal Terrestrial Radio Access (E-UTRA); Relay architectures for E-UTRA (LTE-Advanced) (Release 9)," Mar. 2010 (12 pages).

(Continued)

*Primary Examiner* — Asghar Bilgrami
(74) *Attorney, Agent, or Firm* — Osha Liang LLP (57) ABSTRACT

The present invention relates to a mobile communication method of sending and receiving the signaling of an S1AP/X2AP layer on DRB established between a radio base station DeNB and a relay node RN, the method comprising a step of generating a key $K_{S1X2\_int}$ for performing integrity protection in the above DRB, in an SMC (security mode command) process performed in an attach process of the relay node RN.

3 Claims, 7 Drawing Sheets

(56) References Cited

U.S. PATENT DOCUMENTS

| | | | | |
|---|---|---|---|---|
| 2009/0270099 | A1* | 10/2009 | Gallagher | H04W 8/08 455/435.1 |
| 2010/0260096 | A1* | 10/2010 | Ulupinar | H04B 7/2606 370/315 |
| 2011/0038480 | A1* | 2/2011 | Lin | H04W 12/04 380/270 |
| 2011/0305339 | A1* | 12/2011 | Norrman | H04W 12/04 380/270 |

OTHER PUBLICATIONS

3GPP TR 33.821 V9.0.0, "3rd Generation Partnership Project; Technical Specification Group Services and System Aspects; Rationale and track of security decisions in Long Term Evolved (LTE) RAN / 3GPP System Architecture Evolution (SAE) (Release 9)," Jun. 2009 (9 pages).
3GPP TS 33.401 V9.4.0, "3rd Generation Partnership Project; Technical Specification Group Services and System Aspects; 3GPP System Archtecture Evolution (SAE); Security architecture (Release 9)," Jun. 2010 (7 pages).
3GPP TS 36.331 V9.3.0, "3rd Generation Partnership Project; Technical Specification Group Radio Access Network; Evolved Universal Terrestrial Radio Access (E-UTRA); Radio Resource Control (RRC); Protocol specification (Release 9)," Jun. 2010 (13 pages).
3GPP TS 36.300 V10.0.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," Jun. 2010 (183 pages).
3GPP TS 36.300 V10.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," Jun. 2011 (194 pages).
3GPP TS 36.331 V10.2.0, "3rd Generation Partnership Project; Technical Specification Group Radio Access Network; Evolved Universal Terrestrial Radio Access (E-UTRA); Radio Resource Control (RRC); Protocol specification (Release 10)," Jun. 2011 (295 pages).

Office Action ("Notice of Grounds for Rejection") mailed on Sep. 6, 2011 in corresponding Japanese Application No. 2010-181881, with English translation (6 pages).
Office Action ("Decision of Refusal") mailed on Mar. 13, 2012 in corresponding Japanese Application No. 2010-181881, with English translation (6 pages).
International Search Report issued in PCT/JP2011/068446, mailed on Sep. 6, 2011, with translation (2 pages).
Office Action issued in counterpart Australian Patent Application No. 2011291790 dated Mar. 18, 2014 (3 pages).
Office Action for corresponding Japanese Application No. 2012-133798, mailed Nov. 26, 2013 (4 pages).
Extended European Search Report for corresponding European Application No. 11818155.1, mailed Dec. 4, 2013 (8 pages).
Huawei; "analysis on Un interface security;" 3GPP TSG-SA3 (Security) VSA3#60, S3-100727; Montreal, Canada; Jun. 28-Jul. 2, 2010 (5 pages).
Ericsson et al.; "Security of Un interface;" 3GPP TSG SA WG3 Security—S3#59, S3-100501; Lisbon, Portugal; Apr. 26-30, 2010 (4 pages).
3GPP TR 36.806 V0.2.2; "3rd Generation Partnership Project; Technical Specification Group Radio Access Network; Evolved Universal Terrestrial Radio Access (E-UTRA); Relay architectures for E-UTRA (LTE-Advanced) (Release 9);" Feb. 2010 (29 pages).
Office Action issued in counterpart Korean application No. 10-2013-7004711 mailed Mar. 27, 2014 (7 pages).
Office Action in corresponding Mexican application No. MX/a/2013/001865 dated Jun. 26, 2013 (5 pages).
Office Action issued in counterpart Australian Patent Application No. 2011291790 mailed on Aug. 13, 2014 (4 pages).
Office Action mailed on Jan. 4, 2015 in corresponding Chinese Application No. 201180039292.4, (16 pages).
3GPP TSG-SA3 SA3#60, S3-100896; Living Document on "Key Security Issues of Relay Node Architectures"; Montreal, Canada; Jun. 28-Jul. 2, 2010 (33 pages).
Office Action (Notification of the patentability examination results) mailed on Feb. 16, 2015 in corresponding Russian Application No. 2013110870/08(016085) (8 pages).
Office Action for corresponding Korean Application No. 10-2013-7004711, mailed Oct. 28, 2014 (5 pages).
Office Action in counterpart Chinese Patent Application No. 201180039292.4 issued on Sep. 7, 2015 (16 pages).
Office Action for corresponding Indonesian Application No. W00201301029, mailed Mar. 18, 2015 (5 pages).

* cited by examiner

```
-- SecurityCommand massage
-- ASN1START
SecurityModeCommand ::=        SEQUENCE {
    rrc-TransactionIdentifier      RRC-TransactionIdentifier,
    criticalExtensions             CHOICE {
        c1                             CHOICE{
            securityModeCommand-r8         SecurityModeCommand-r8-IEs,
            spare3 NULL, spare2 NULL, spare1 NULL
        },
        criticalExtensionsFuture       SEQUENCE {}
    }
}

SecurityModeCommand-r8-IEs ::=  SEQUENCE {
    securityConfigSMC               SecurityConfigSMC,
    nonCriticalExtension            SecurityModeCommand-v8a0-IEs                OPTIONAL
}

SecurityModeCommand-v8a0-IEs ::= SEQUENCE {
    lateR8NonCriticalExtension      OCTET STRING                       OPTIONAL,   -- Need OP
    nonCriticalExtension            SEQUENCE {}                        OPTIONAL-- Need OP
} securityConfigSMC ::=           SEQUENCE {
    securityAlgorithmConfig         SecurityAlgorithmConfig,
    ...
}
-- ASN1STOP
```

SecurityAlgorithmConfig information element
```
-- ASN1START
SecurityAlgorithmConfig ::=     SEQUENCE {
    cipheringAlgorithm              ENUMERATED {
                                        eea0, eea1, eea2, spare5, spare4, spare3,
                                        spare2, spare1, ...},
    integrityProtAlgorithm          ENUMERATED {
                                        eia0-v920, eia1, eia2, spare5, spare4, spare3,
                                        spare2, spare1, ...}
}
-- ASN1STOP
```

| SecurityAlgorithmConfig field description |
|---|
| integrityProtAlgorithm<br>Indicates the integrity protection algorithm to be used for SRBs, as specified in TS 33.401 [32, 5.1.4.2]. |
| cipheringAlgorithm<br>Indicates the ciphering algorithm to be used for SRBs and DRBs, as specified in TS 33.401 [32, 5.1.3.2]. |

MOBILE COMMUNICATION METHOD, RELAY NODE, AND RADIO BASE STATION

TECHNICAL FIELD

The present invention relates to a mobile communication method, a relay node, and a radio base station.

BACKGROUND ART

In an LTE (Long Term Evolution)-Advanced scheme, it is possible to use a relay node RN connectable to a radio base station DeNB (Doner eNB) through a Un interface.

The relay node RN is configured to perform radio communication with the radio base station DeNB via the Un interface, and perform radio communication with a mobile station UE via a Uu interface.

CITATION LIST

Non Patent Literature

[NPL 1] 3GPP TS36.300 (V10.0.0), "Evolved Universal Terrestrial Radio Access (E-UTRA) and Evolved Universal Terrestrial Radio Access Network (E-UTRAN) Physical Channels", June, 2010

[NPL 2] 3GPP TS33.401 (V9.4.0), "3GPP System Architecture Evolution (SAE); Security architecture", June 2010

SUMMARY OF INVENTION

Technical Problem

The LTE-Advanced scheme is configured such that in a radio zone (hereinafter, the Un radio zone) in which the Un interface is used, the signaling of an S1AP/X2AP layer is sent on DRB (Data Radio Bearer) as U-plane data.

However, the above-mentioned configuration has a problem that because integrity protection is not performed for the DRB in the Un radio zone, the security for the signaling of the S1AP/X2AP layer weakens when NDP (Network Domain Security)/IP is not used.

Thus, the present invention has been achieved in view of the above problem, and an object thereof is to provide a mobile communication method, a relay node, and a radio base station with which it is possible to strengthen the security for the signaling of the S1AP/X2AP layer that is sent and received in the Un radio zone.

Solution to Problem

A first characteristic of the present invention is summarized as a mobile communication method of sending and receiving the signaling of a predetermined protocol layer on a data radio bearer established between a radio base station and a relay node, the method comprising a step of generating a key for performing integrity protection in the data radio bearer, in a security mode command process performed in an attach process of the relay node.

A second characteristic of the present invention is summarized as a mobile communication method of sending and receiving the signaling of a predetermined protocol layer on a data radio bearer established between a radio base station and a relay node, the method comprising a step of generating a key for performing integrity protection in the data radio bearer, in a security mode command process performed after an attach process of the relay node is complete.

A third characteristic of the present invention is summarized as a mobile communication method of sending and receiving the signaling of a predetermined protocol layer on a data radio bearer established between a radio base station and a relay node, the method comprising a step of generating a key for performing integrity protection in the data radio bearer, in a process of setting a subframe used between the radio base station and the relay node.

A fourth characteristic of the present invention is summarized as a relay node connectable to a radio base station, wherein the relay node is configured to send and receive the signaling of a predetermined protocol layer on a data radio bearer established with the radio base station, and to generate a key for performing integrity protection in the data radio bearer, in a security mode command process performed in an attach process of the relay node.

A fifth characteristic of the present invention is summarized as a radio base station to which a relay node is connectable, wherein the radio base station is configured to send and receive the signaling of a predetermined protocol layer on a data radio bearer established with the relay node, and to generate a key for performing integrity protection in the data radio bearer, in a security mode command process performed in an attach process of the relay node.

A sixth characteristic of the present invention is summarized as a relay node connectable to a radio base station, wherein the relay node is configured to send and receive the signaling of a predetermined protocol layer on a data radio bearer established with the radio base station, and to generate a key for performing integrity protection in the data radio bearer, in a security mode command process performed after an attach process of the relay node is complete.

A seventh characteristic of the present invention is summarized as a radio base station to which a relay node is connectable, wherein the radio base station is configured to send and receive the signaling of a predetermined protocol layer on a data radio bearer established with the relay node, and to generate a key for performing integrity protection in the data radio bearer, in a security mode command process performed after an attach process of the relay node is complete.

An eighth characteristic of the present invention is summarized as a relay node connectable to a radio base station, wherein the relay node is configured to send and receive the signaling of a predetermined protocol layer on a data radio bearer established with the radio base station, and to generate a key for performing integrity protection in the data radio bearer, in a process of setting a subframe used with the radio base station.

A ninth characteristic of the present invention is summarized as a radio base station to which a relay node is connectable, wherein the radio base station is configured to send and receive the signaling of a predetermined protocol layer on a data radio bearer established with the relay node, and to generate a key for performing integrity protection in the data radio bearer, in a process of setting a subframe used with the relay node.

Advantageous Effects of Invention

As described above, according to the present invention, it is possible to provide a mobile communication method, a relay node, and a radio base station with which it is possible to strengthen the security for the signaling of the S1AP/X2AP layer that is sent and received in the Un radio zone.

DESCRIPTION OF EMBODIMENTS (Mobile Communication System According to First Embodiment of the Present Invention)

With reference to FIG. 1 to FIG. 6, a mobile communication system according to a first embodiment of the present invention will be described.

Figure 1:
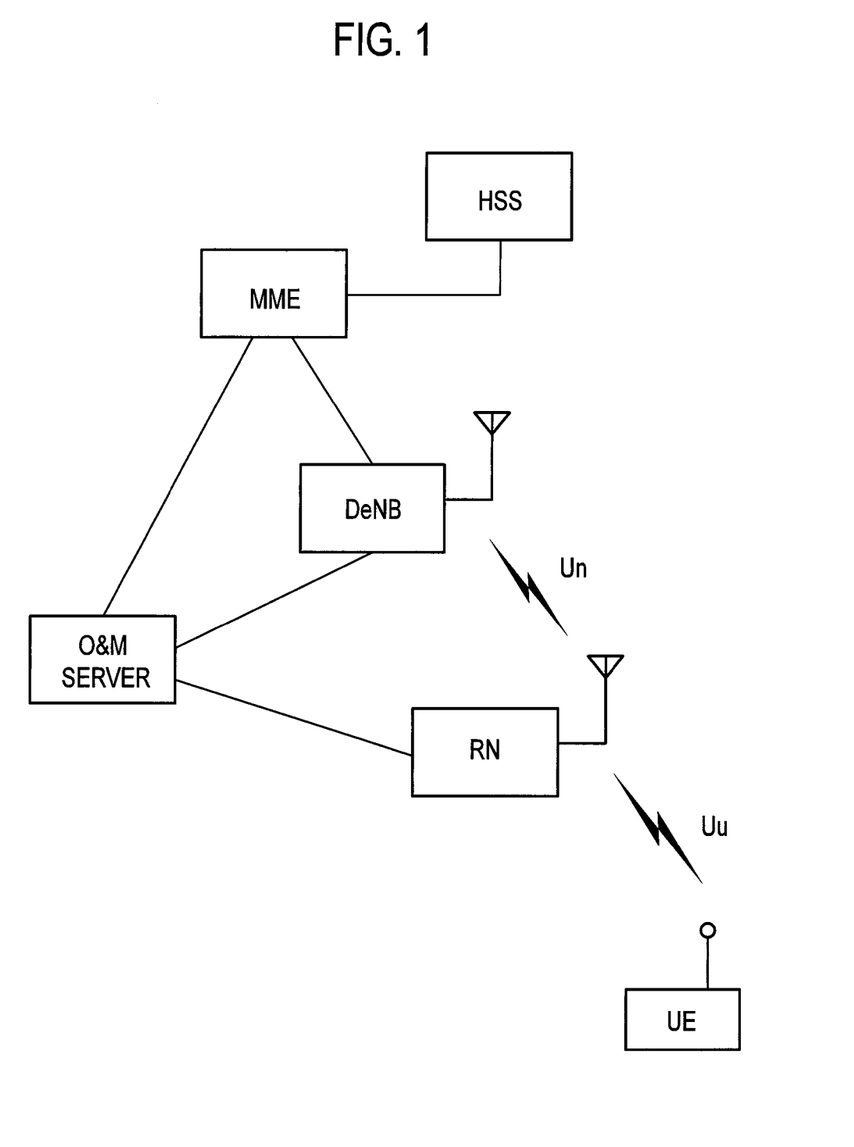
FIG. 1 is a diagram illustrating the entire configuration of a mobile communication system according to a first embodiment of the present invention.

The mobile communication system according to the present embodiment is an LTE-Advanced mobile communication system, and includes a subscriber information management server HSS (Home Subscriber Server), a mobile management node MME (Mobility Management Entity), a radio base station DeNB, a relay node RN, and an O&M (Operation and Maintenance) server, as illustrated in FIG. 1.

The relay node RN is configured to perform radio communication with the radio base station DeNB via the Un interface, and perform radio communication with a mobile station UE via a Uu interface.

Figure 2:
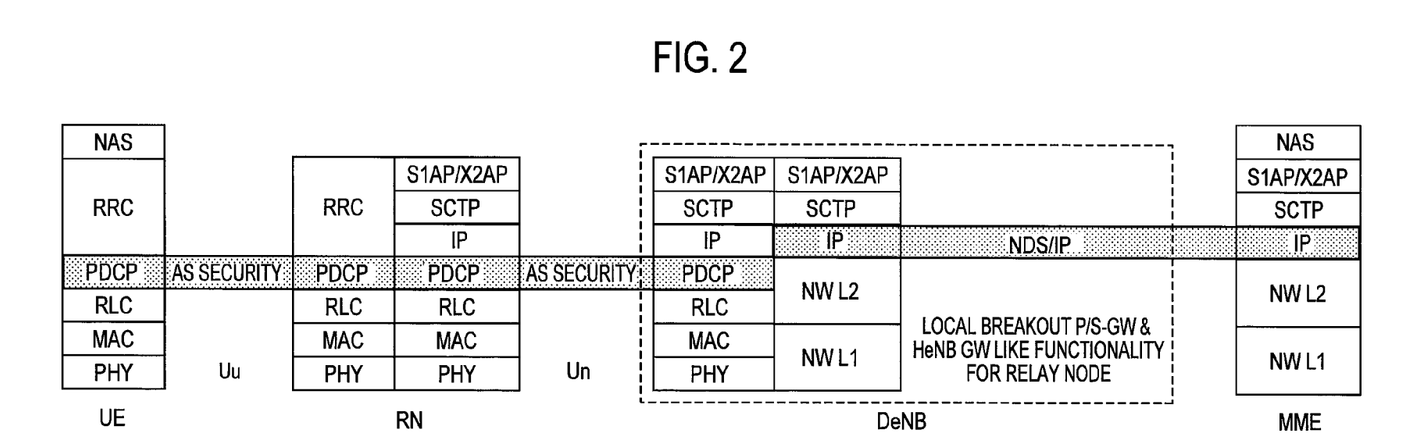
FIG. 2 is a protocol stack diagram of the radio base station according to the first embodiment of the present invention.

FIG. 2 illustrates a protocol stack used in the mobile communication system according to the present embodiment.

As illustrated in FIG. 2, the mobile station UE includes a physical (PHY) layer function, a MAC (Media Access Control) layer function provided as an upper-layer function of the physical (PHY) layer function, an RLC (Radio Link Control) layer function provided as an upper-layer function of the MAC layer function, a PDCP (Packet Data Convergence Protocol) layer function provided as an upper-layer function of the RLC layer function, an RRC (Radio Resource Control) layer function provided as an upper-layer function of the PDCP layer function, and a NAS (Non Access Stratum) layer function provided as an upper-layer function of the RRC layer function, in the radio zone (hereinafter, the Uu radio zone) in which the Uu interface is used.

Furthermore, the relay node RN includes a physical (PHY) layer function, a MAC layer function provided as an upper-layer function of the physical (PHY) layer function, an RLC layer function provided as an upper-layer function of the MAC layer function, a PDCP layer function provided as an upper-layer function of the RLC layer function, and an RRC layer function provided as an upper-layer function of the PDCP layer function, in the Uu radio zone.

In addition, the relay node RN and the radio base station DeNB include a physical (PHY) layer function, a MAC layer function provided as an upper-layer function of the physical (PHY) layer function, an RLC layer function provided as an upper-layer function of the MAC layer function, a PDCP layer function provided as an upper-layer function of the RLC layer function, an IP (Internet Protocol) layer function provided as an upper-layer function of the PDCP layer function, an SCTP (Stream Control Transmission Protocol) layer function provided as an upper-layer function of the IP layer function, and an S1AP/X2AP layer function provided as an upper-layer function of the SCTPIP layer function, in the Un radio zone.

That is, the signaling of the S1AP/X2AP layer is configured to be sent and received on the DRB that is established between the radio base station DeNB and the relay node RN (that is, in the Un radio zone).

Furthermore, the radio base station DeNB includes a network layer 1 (NW L1) function, a network layer 2 (NW L2) function provided as an upper-layer function of the network layer 1 function, an IP layer function provided as an upper-layer function of the network layer 2 function, an SCTP layer function provided as an upper-layer function of the IP layer function, and an S1AP/X2AP layer function provided as an upper-layer function of the SCTP layer function, in the interface with the mobile management node MME.

Similarly, the mobile management node MME includes a network layer 1 (NW L1) function, a network layer 2 (NW L2) function provided as an upper-layer function of the network layer 1 function, an IP layer function provided as an upper-layer function of the network layer 2 function, an SCTP layer function provided as an upper-layer function of the IP layer function, an S1AP/X2AP layer function provided as an upper-layer function of the SCTP layer function, and a NAS layer function provided as an upper-layer function of the S1AP/X2AP layer function, in the interface with the radio base station DeNB.

NDS/IP may be used as the IP layer function of the radio base station DeNB and the mobile management node MME.

The relay node RN is configured to generate a key $K_{S1X2\_int}$ for performing integrity protection in the DRB established in the Un radio zone for sending the signaling of the S1AP/X2AP layer.

Figure 3:
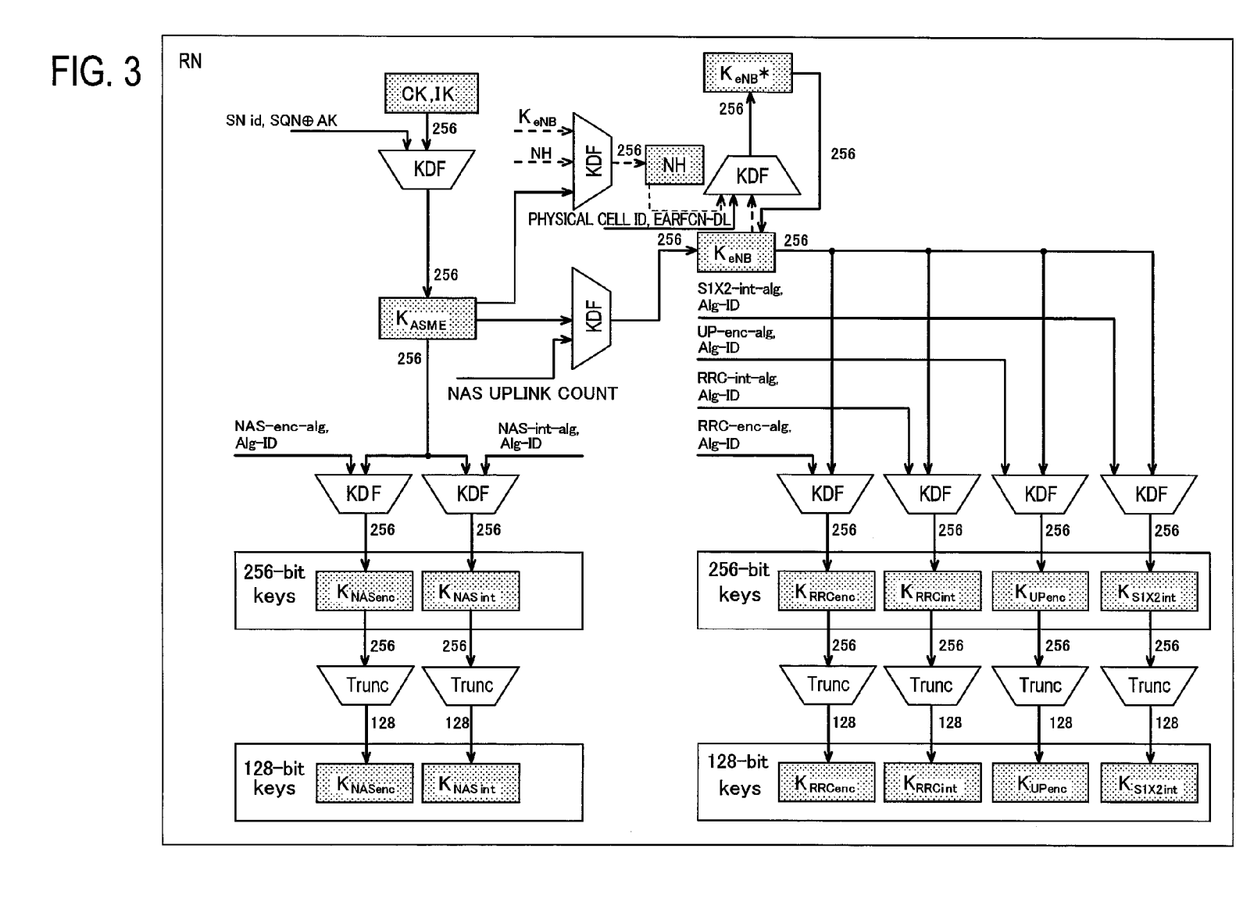
FIG. 3 is a diagram for explaining an operation of generating a key in the mobile communication system according to the first embodiment of the present invention.

For example, as illustrated in FIG. 3, the relay node RN is configured to generate the key $K_{S1X2\_int}$ similar to a key $K_{eNB}$, a key $K_{RRC\_enc}$, a key $K_{RRC\_int}$, and a key $K_{UP\_enc}$, in accordance with the stipulation of 3GPP TS33.401, in an SMC (Security Mode Command) process performed in the attach process of the relay node RN.

Figure 4:
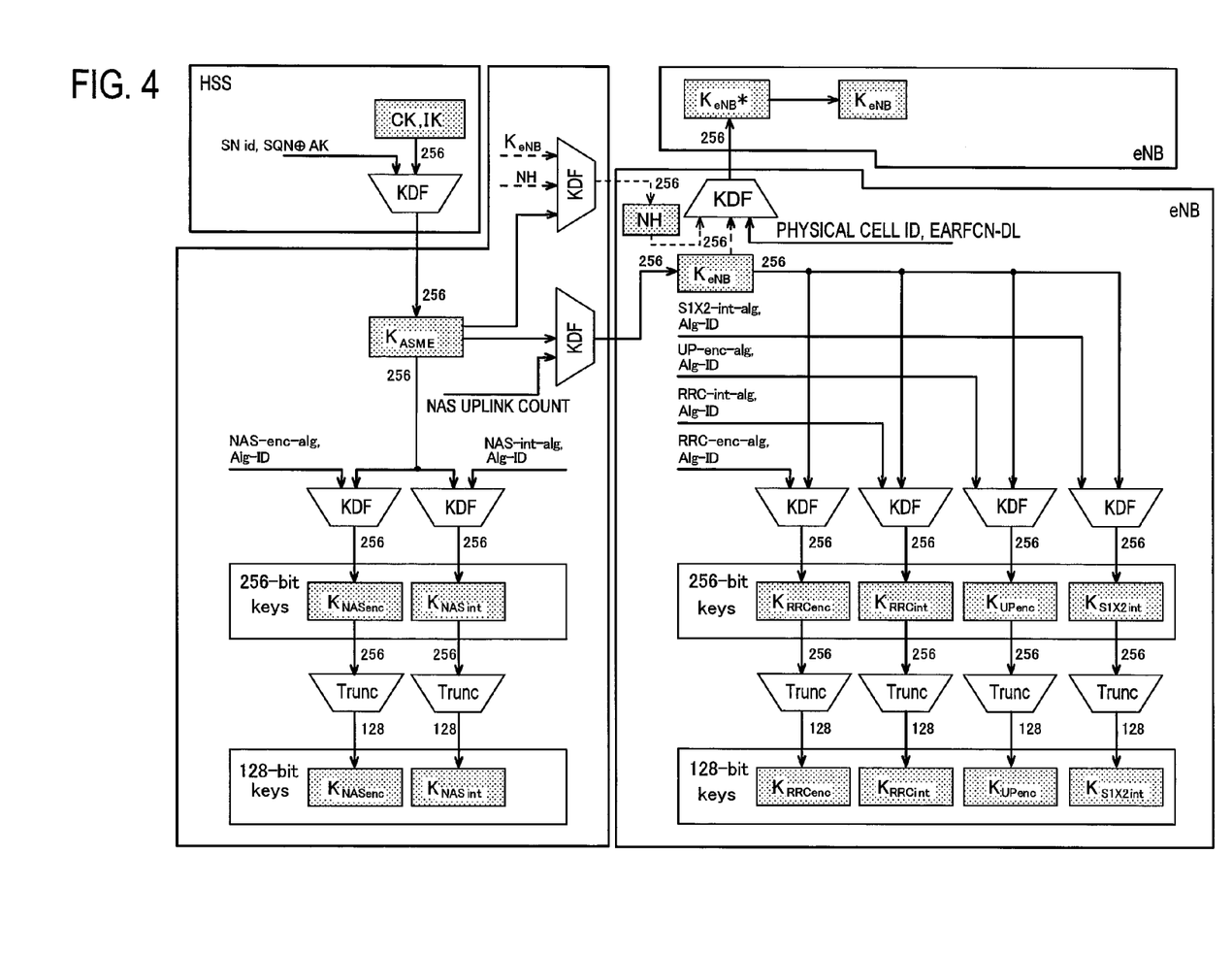
FIG. 4 is a diagram for explaining an operation of generating a key in the mobile communication system according to the first embodiment of the present invention.

Similarly, as illustrated in FIG. 4, the radio base station DeNB is configured to generate the key $K_{S1X2\_int}$ similar to the key $K_{eNB}$, the key $K_{RRC\_enc}$, the key $K_{RRC\_int}$, and the key $K_{UP\_enc}$, in accordance with the stipulation of 3GPP TS33.401, in the SMC process performed in the attach process of the relay node RN.

Figure 5:
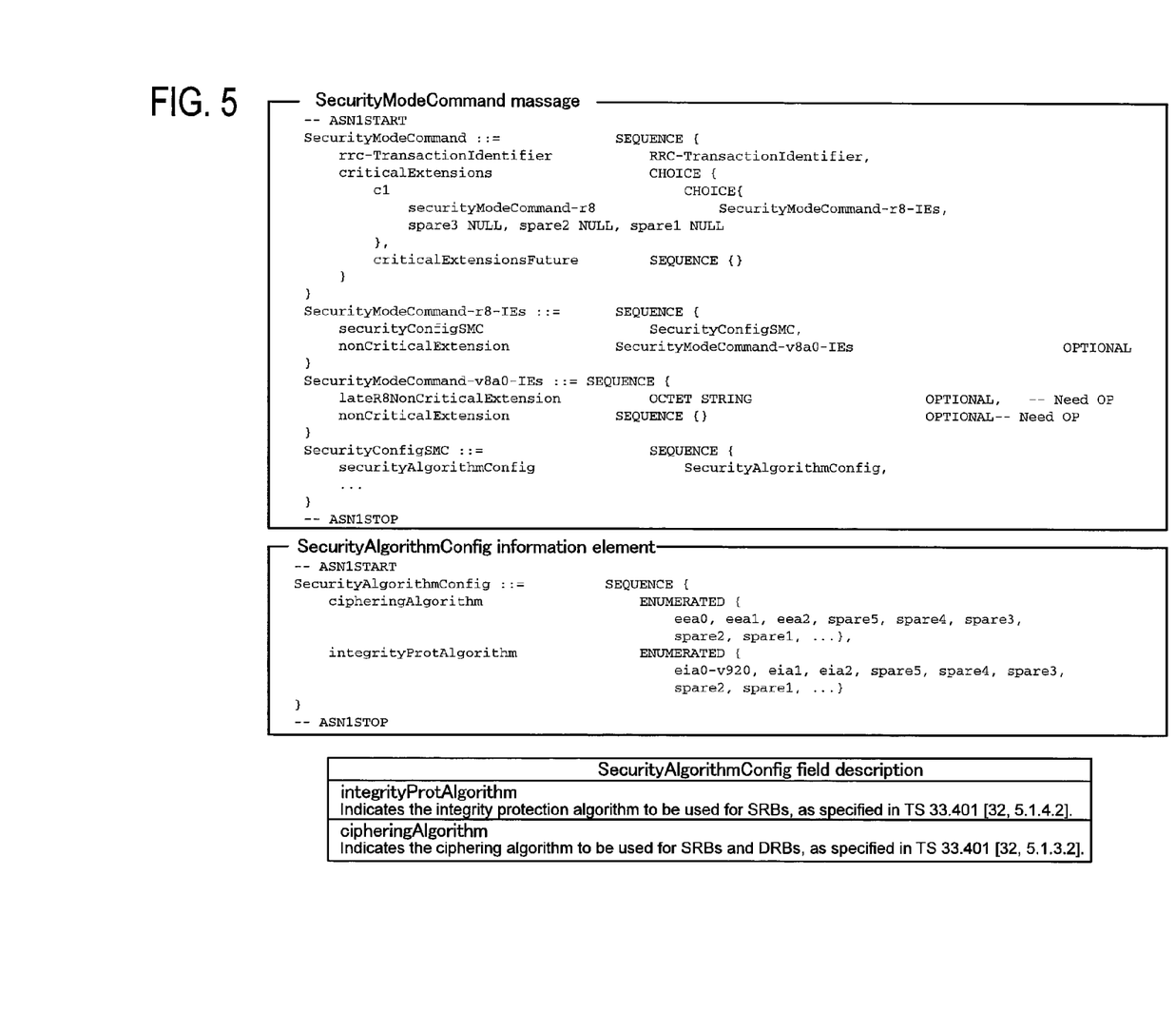
FIG. 5 is a diagram illustrating one example of a format of "Security Mode Command" used in the mobile communication system according to the first embodiment of the present invention.

As illustrated in FIG. 5, in the above SMC process, in accordance with the stipulation of 3GPP TS33.401 and the like, the relay node RN and the subscriber information management server HSS are configured to generate "CK" and "IK" using "cipheringAlgoritm (such as EEA0)" and "integrityProtection (such as EIA0)" that are set in an information element "SecurityAlgoritmConfig" in "Security Mode Command" received from the radio base station DeNB.

Hereinafter, with reference to FIG. 6, the operation of the mobile communication system according to the present embodiment will be described.

Figure 6:
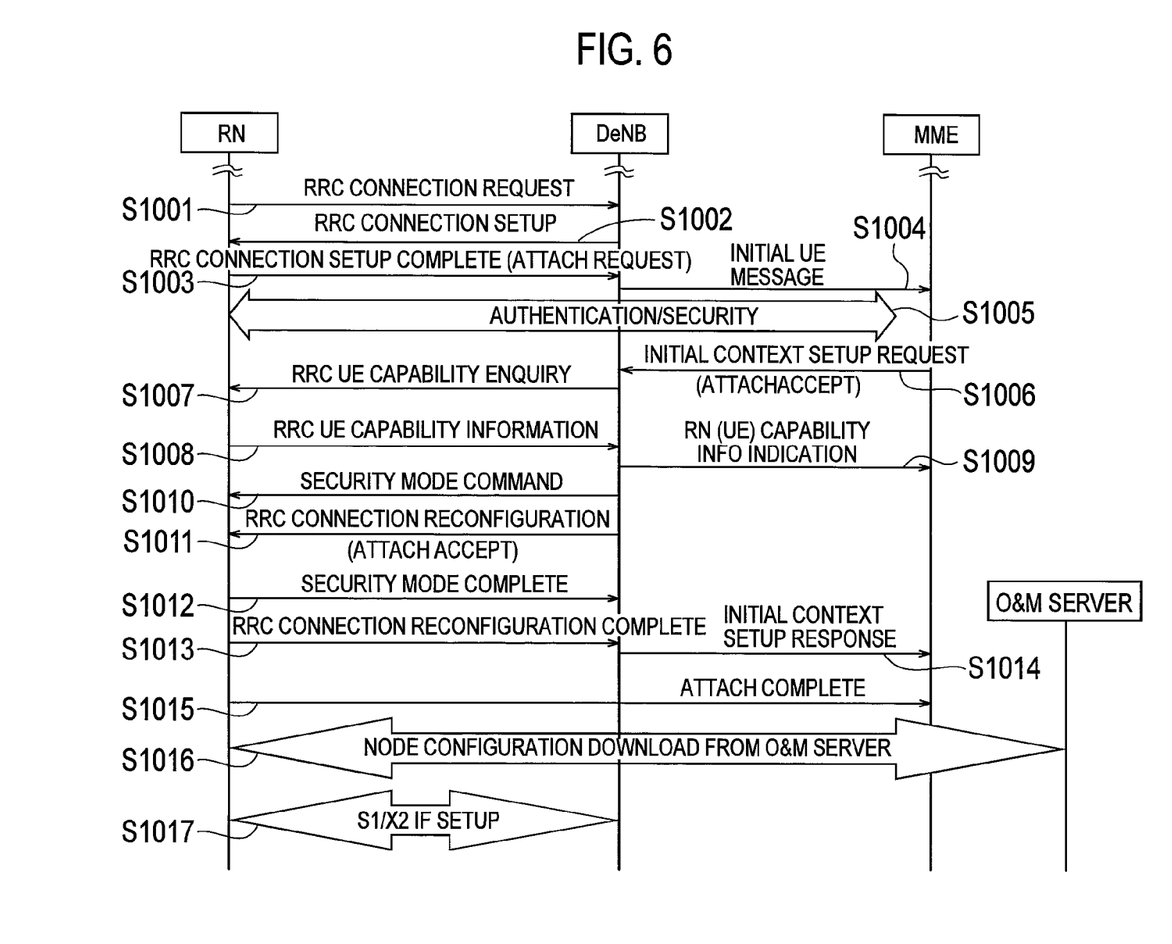
FIG. 6 is a sequence diagram illustrating an operation of the mobile communication system according to the first embodiment of the present invention.

As illustrated in FIG. 6, in step S1001, the relay node RN sends "RRC Connection Request" to the radio base station DeNB.

In step S1002, the radio base station DeNB sends "RRC Connection Setup" to the relay node RN.

In step S1003, the relay node RN sends "RRC Connection Setup Complete" including "Attach Request" to the radio base station DeNB.

In step S1004, the radio base station DeNB sends "Initial UE Message" to the mobility management node MME.

In step S1005, an "Authentication/Security" process is performed.

In step S1006, the mobility management node MME sends "Initial Context Setup Request" including "Attach Accept" to the radio base station DeNB.

In step S1007, the radio base station DeNB sends "RRC UE (RN) Capability Enquiry" to the relay node RN.

In step S1008, the relay node RN sends "RRC UE (RN) Capability Information" to the radio base station DeNB.

In step S1009, the radio base station DeNB sends "UE (RN) Capability Info Indication" to the mobility management node MME.

In step S1010, the radio base station DeNB sends "Security Mode Command" to the relay node RN.

As illustrated in FIG. 5, the radio base station DeNB notifies, to the relay node RN, "cipheringAlgoritm (such as EEA0)" and "integrityProtection (such as EIA0)" for generating the "CK" and the "IK", by the "Security Mode Command".

As a result, as illustrated in FIG. 3, the relay node RN generates the key $K_{S1X2\_int}$ similar to the key $K_{eNB}$, the key $K_{RRC\_enc}$, the key $K_{RRC\_int}$, and the key $K_{UP\_enc}$, based on the "cipheringAlgoritm (such as EEA0)" and "integrityProtection (such as EIA0)".

Similarly, as illustrated in FIG. 4, the radio base station DeNB generates the key $K_{S1X2\_int}$ similar to the key $K_{eNB}$, the key $K_{RRC\_enc}$, the key $K_{RRC\_int}$, and the key $K_{UP\_enc}$, based on the "cipheringAlgoritm (such as EEA0)" and "integrityProtection (such as EIA0)".

In step S1011, the radio base station DeNB sends "RRC Connection Reconfiguration" including "Attach Accept".

The relay node RN sends "Security Mode Complete" to the radio base station DeNB in step S1012, and sends "RRC Connection Reconfiguration Complete" to the radio base station DeNB in step S1013.

In step S1014, the radio base station DeNB sends "Initial Context Setup Response" to the mobility management node MME.

In step S1015, the relay node RN sends "Attach Complete" to the mobile management node MME.

In step S1016, the relay node RN downloads the setup information of the relay node (Node Configuration) from the O&M server, and in step S1017, the relay node RN sets an S1/X2 interface with the radio base station DeNB.

According to the mobile communication system of the present embodiment, because the relay node RN and the radio base station DeNB can perform integrity protection for the DRB that sends and receives the S1AP/X2AP layer, in the Un radio zone, by using the key $K_{S1X2\_int}$ generated in the above SMC process, the security for the signaling of the S1AP/X2AP layer can be strengthened.

(First Modification)

Hereinafter, a mobile communication system according to a first modification will be explained with focusing on the difference relative to the mobile communication system according to the aforementioned first embodiment.

In the mobile communication system according to the first modification, a new SMC process is defined for the relay node RN, and in the SMC process, as illustrated in FIG. 3, the relay node RN is configured to generate the key $K_{S1X2\_int}$ similar to the key $K_{eNB}$, the key $K_{RRC\_enc}$, the key $K_{RRC\_int}$, and the key $K_{UP\_enc}$, in accordance with the stipulation of 3GPP TS33.401.

Similarly, as illustrated in FIG. 4, in the SMC process, the radio base station DeNB is configured to generate the key $K_{S1X2\_int}$ similar to the key $K_{eNB}$, the key $K_{RRC\_enc}$, the key $K_{RRC\_int}$, and the key $K_{UP\_enc}$, in accordance with the stipulation of 3GPP TS33.401.

The SMC process is performed after the attach process of the relay node RN is complete.

(Second Modification)

Hereinafter, a mobile communication system according to a second modification will be described with focusing on the difference relative to the mobile communication system according to the above-described first embodiment, with reference to FIG. 7.

In the mobile communication system according to the second modification, as stipulated in the contributed article R1-103874 of 3GPP, the relay node RN is configured to generate the key $K_{S1X2\_int}$ similar to the key $K_{eNB}$, the key $K_{RRC\_enc}$, the key $K_{RRC\_int}$, and the key $K_{UP\_enc}$, in accordance with the stipulation of 3GPP TS33.401, in the new RRC procedure defined for performing the process of setting an MBSFN (MBMS Single frequency Network) subframe used between the radio base station DeNB and the relay node RN, as illustrated in FIG. 3.

Similarly, as illustrated in FIG. 4, in the RRC procedure, the radio base station DeNB is configured to generate the key $K_{S1X2\_int}$ similar to the key $K_{eNB}$, the key $K_{RRC\_enc}$, the key $K_{RRC\_int}$, and the key $K_{UP\_enc}$, in accordance with the stipulation of 3GPP TS33.401.

Figure 7:
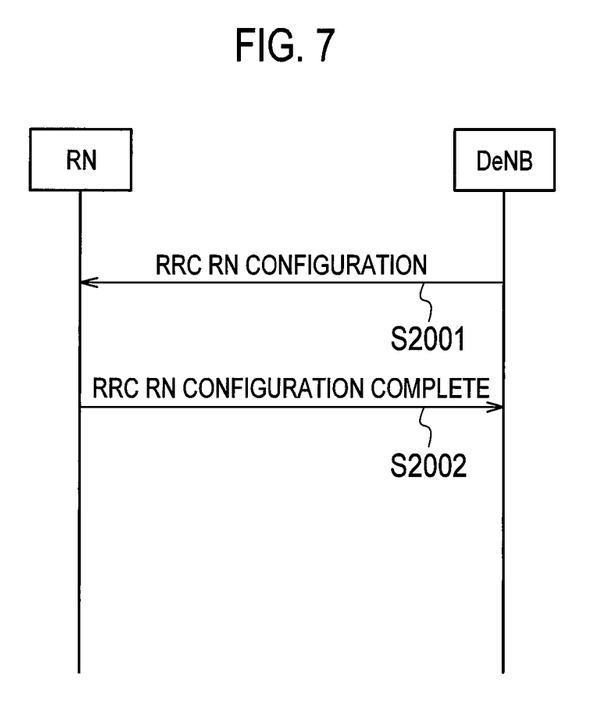
FIG. 7 is a sequence diagram illustrating an operation of the mobile communication system according to a second modification of the present invention.

Specifically, as illustrated in FIG. 7, in step S2001, the radio base station DeNB sends, to the relay node RN, "RRC RN Configuration" including "cipheringAlgoritm (such as EEA0)" and "integrityProtection (such as EIA0)" for generating the "CK" and the "IK".

As illustrated in FIG. 3, the relay node RN generates the key $K_{S1X2\_int}$ similar to the key $K_{eNB}$, the key $K_{RRC\_enc}$, the key $K_{RRC\_int}$, and the key $K_{UP\_enc}$ based on the "cipheringAlgoritm (such as EEA0)" and "integrityProtection (such as EIA0)".

Similarly, as illustrated in FIG. 4, the radio base station DeNB generates the key $K_{S1X2\_int}$ similar to the key $K_{eNB}$, the key $K_{RRC\_enc}$, the key $K_{RRC\_int}$, and the key $K_{UP\_enc}$, based on the "cipheringAlgoritm (such as EEA0)" and "integrityProtection (such as EIA0)".

In step S2002, the relay node RN sends "RRC RN Configuration Complete" to the radio base station DeNB.

The characteristics of the present embodiment as described above may be expressed as follows.

A first characteristic of the present embodiment is summarized as a mobile communication method of sending and receiving the signaling of an S1AP/X2AP layer (predetermined protocol layer) on DRB (data radio bearer) established between a radio base station DeNB and a relay node RN, the method comprising a step of generating a key $K_{S1X2\_int}$ for performing integrity protection in the above DRB, in an SMC (security mode command) process performed in an attach process of the relay node RN.

A second characteristic of the present embodiment is summarized as a mobile communication method of sending and receiving the signaling of an S1AP/X2AP layer on DRB established between a radio base station DeNB and a relay node RN, the method comprising a step of generating a key $K_{S1X2\_int}$ for performing integrity protection in the above DRB, in an SMC process performed after an attach process of the relay node RN is complete.

A third characteristic of the present embodiment is summarized as a mobile communication method of sending and receiving the signaling of an S1AP/X2AP layer on DRB established between a radio base station DeNB and a relay node RN, the method comprising a step of generating a key $K_{S1X2\_int}$ for performing integrity protection in the above DRB, in a process of setting an MBSFN subframe used between the radio base station DeNB and the relay node RN.

A fourth characteristic of the present embodiment is summarized as a relay node RN connectable to a radio base station DeNB, wherein the relay node RN is configured to send and receive the signaling of an S1AP/X2AP layer on DRB established with the radio base station DeNB, and to generate a key $K_{S1X2\_int}$ for performing integrity protection in the above DRB, in an SMC process performed in an attach process of the relay node RN.

A fifth characteristic of the present embodiment is summarized as a radio base station DeNB to which a relay node RN is connectable, wherein the radio base station DeNB is configured to send and receive the signaling of an S1AP/X2AP layer on DRB established with the relay node RN, and to generate a key $K_{S1X2\_int}$ for performing integrity protection in the above DRB, in an SMC process performed in an attach process of the relay node RN.

A sixth characteristic of the present embodiment is summarized as a relay node RN connectable to a radio base station DeNB, wherein the relay node RN is configured to send and receive the signaling of an S1AP/X2AP layer on DRB established with the radio base station DeNB, and to generate a key $K_{S1X2\_int}$ for performing integrity protection in the above DRB, in an SMC process performed after an attach process of the relay node RN is complete.

A seventh characteristic of the present embodiment is summarized as a radio base station DeNB to which a relay node RN is connectable, wherein the radio base station DeNB is configured to send and receive the signaling of an S1AP/X2AP layer on DRB established with the relay node RN, and to generate a key $K_{S1X2\_int}$ for performing integrity protection in the above DRB, in an SMC process performed after an attach process of the relay node RN is complete.

An eighth characteristic of the present embodiment is summarized as a relay node RN connectable to a radio base station DeNB, wherein the relay node RN is configured to send and receive the signaling of an S1AP/X2AP layer on DRB established with the radio base station DeNB, and to generate a key $K_{S1X2\_int}$ for performing integrity protection in the above DRB, in a process of setting an MBSFN subframe used with the radio base station DeNB.

A ninth characteristic of the present embodiment is summarized as a radio base station DeNB to which a relay node RN is connectable, wherein the radio base station DeNB is configured to send and receive the signaling of an S1AP/X2AP layer on DRB established with the relay node RN, and to generate a key $K_{S1X2\_int}$ for performing integrity protection in the above DRB, in a process of setting an MBSFN subframe used with the relay node RN.

It should be noted that the operation of the subscriber information management server HSS, the mobile management node MME, the radio base station DeNB, the relay node RN, or the mobile station UE may be performed by hardware, a software module performed by a processor, or a combination thereof.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can write and read information into and from the storage medium. Such a storage medium may also be accumulated in the processor. Such a storage medium and processor may be arranged in an ASIC. The ASIC may be arranged in the subscriber information management server HSS, the mobile management node MME, the radio base station DeNB, the relay node RN, or the mobile station UE. Furthermore, such a storage medium and processor may be arranged in the subscriber information management server HSS, the mobile management node MME, the radio base station DeNB, the relay node RN, or the mobile station UE as discrete components.

Thus, the present invention has been explained in detail by using the above-described embodiments; however, it is obvious that for persons skilled in the art, the present invention is not limited to the embodiments explained herein. The present invention can be implemented as a corrected and modified mode without departing the gist and the scope of the present invention defined by the claims. Therefore, the description of the specification is intended for explaining the example only and does not impose any limited meaning to the present invention.

REFERENCE SIGNS LIST

UE . . . Mobile station
MME . . . Mobile management node
RN . . . Relay node
DeNB . . . Radio base station
HSS . . . Subscriber information management server

The invention claimed is:
1. A mobile communication method, comprising:
a step of generating, by a radio base station, an RRC encryption key ($K_{RRC\_enc}$), an RRC integrity protection key ($K_{RRC\_int}$), and a user-plane (U-Plane) encryption key ($K_{UP\_enc}$), in a radio zone between the radio base station and a relay node:
a step of generating, in a security mode command process performed in an attach process of the relay node, by the radio base station, similar to the key $K_{RRC\_enc}$, the key $K_{RRC\_int}$, and the key $K_{UP\_enc}$, a key for performing integrity protection of U-Plane data in a data radio bearer in the radio zone;
a step of generating, by the relay node, a key $K_{RRC\_enc}$, a key $K_{RRC\_int}$, and a key $K_{UP\_enc}$, in the radio zone; and
a step of generating, in the security mode command process performed in the attach process of the relay node, by the relay node, similar to the key $K_{RRC\_enc}$, the key $K_{RRC\_int}$, and the $K_{UP\_enc}$, a key for performing integrity protection of U-Plane data in the data radio bearer in the radio zone,
wherein the keys for performing the integrity protection in the data radio bearer in the radio zone, generated in the radio base station and the relay node, are generated by using an integrity protection algorithm, Alg-ID, and KeNB.

2. A relay node connectable to a radio base station, wherein the relay node is configured to generate, in a security mode command process performed in an attach process of the relay node, in a radio zone between the radio base station and the relay node, an RRC encryption key ($K_{RRC\_enc}$), an RRC integrity protection key ($K_{RRC\_int}$), and a user-plane (U-Plane) encryption key ($K_{UP\_enc}$), and similar to the key $K_{RRC\_enc}$, the key $K_{RRC\_int}$, and the key $K_{UP\_enc}$, generate a key for performing integrity protection of U-Plane data in a data radio bearer in the radio zone, wherein the keys for performing the integrity protection in the data radio bearer in the radio zone, generated in the radio base station and the relay node, are generated by using an integrity protection algorithm, Alg-ID, and KeNB.

3. A radio base station, to which a relay node is connectable, wherein the radio base station is configured to generate, in a security mode command process performed in an attach process of the relay node, in a radio zone between the radio base station and the relay node, an RRC encryption key ($K_{RRC\_enc}$), an RRC integrity protection key ($K_{RRC\_int}$), and a user-plane (U-Plane) encryption key ($K_{UP\_enc}$), and similar to the key $K_{RRC\_enc}$, the key $K_{RRC\_int}$, and the key $K_{UP\_enc}$, generate a key for performing integrity protection of U-Plane data in a data radio bearer in the radio zone, wherein the keys for performing the integrity protection in the data radio bearer in the radio zone, generated in the radio base station and the relay node, are generated by using an integrity protection algorithm, Alg-ID, and KeNB.

* * * * *